March 20, 1951 H. J. KENNER 2,545,784
ALIGNMENT DEVICE SUPPORT
Filed Dec. 29, 1944 2 Sheets-Sheet 2
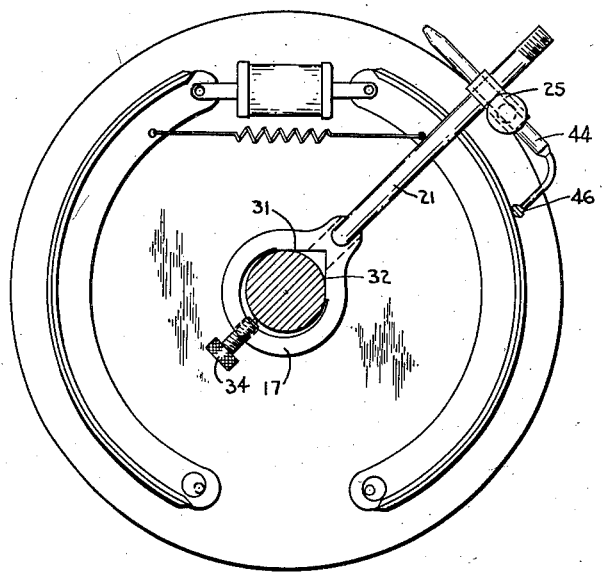
FIG_4_
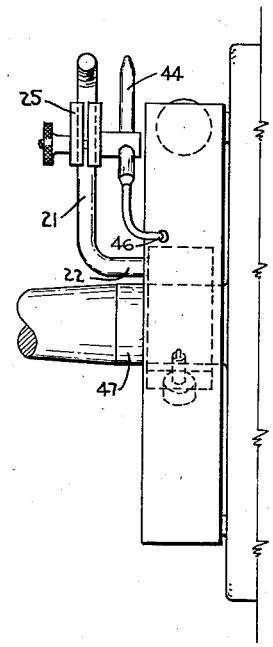
FIG_5_
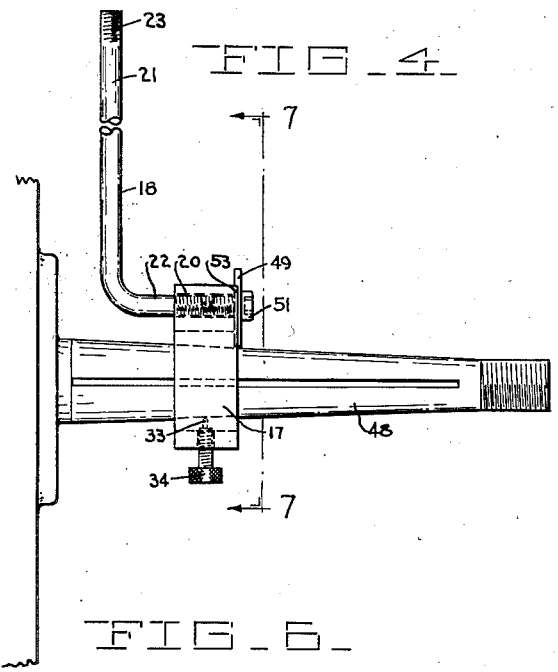
FIG_6_
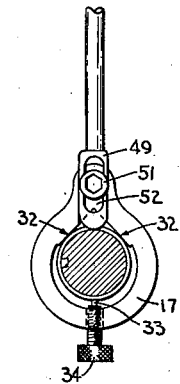
FIG_7_
INVENTOR.
HOWEY J. KENNER
BY Gardner & Warren
his attys.

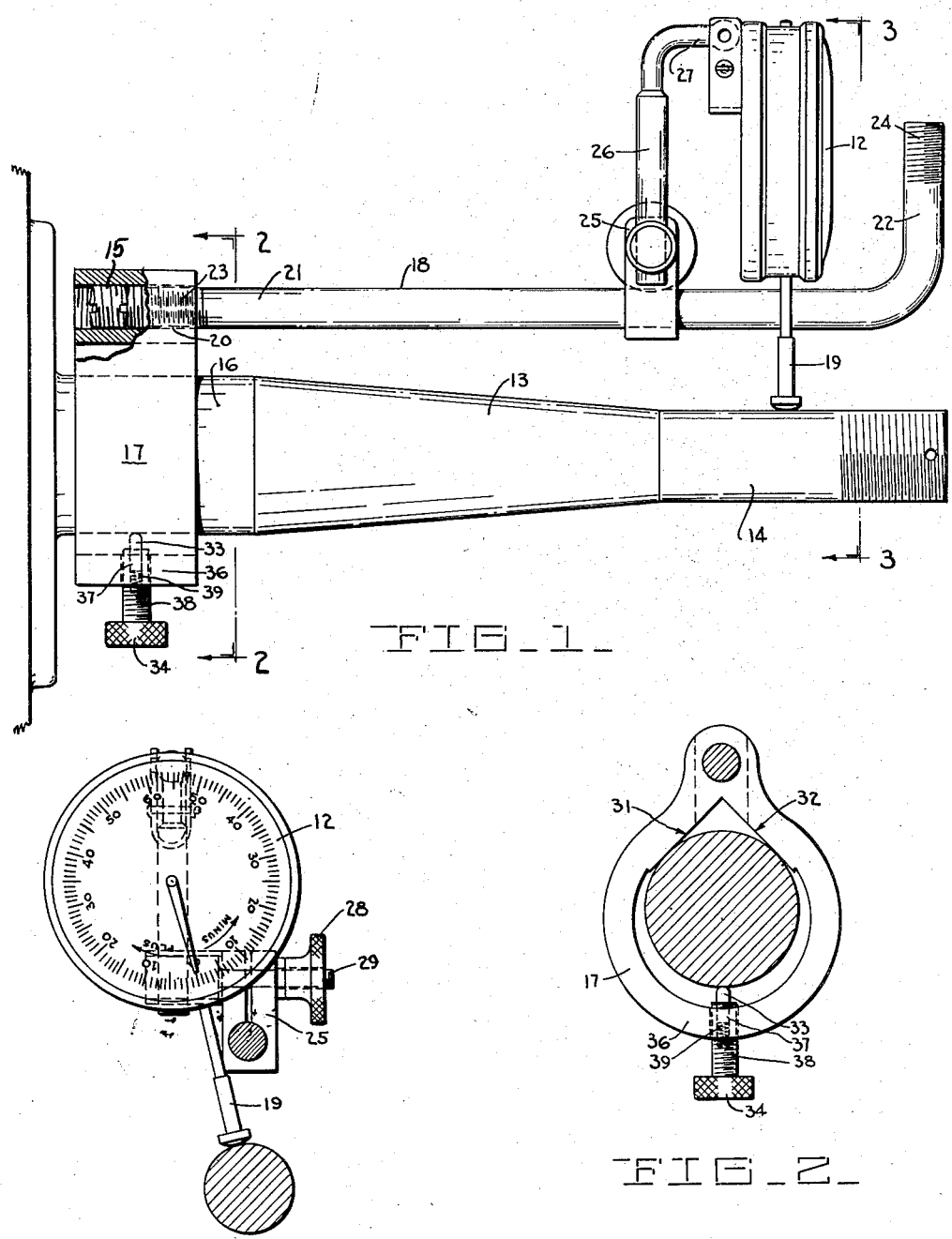

Patented Mar. 20, 1951

2,545,784

UNITED STATES PATENT OFFICE 2,545,784

ALIGNMENT DEVICE SUPPORT

Howey J. Kenner, Oakland, Calif.

Application December 29, 1944, Serial No. 570,342

2 Claims. (Cl. 248—230)

1

This invention relates to a device for determining and correlating curvatures of substantially concentric surfaces. In one of its specific embodiments it pertains to a device for readily checking the alignment or deflection of concentric surfaces occurring in motor or other vehicles such as spindles, brake linings and the like.

An object of the invention is to provide a device of the character described having a means for quickly and easily applying and supporting a deflection gauge or other indicator for rotation with or in respect to a rotating part to permit an accurate check or reading of the alignment or concentricity between different parts or different portions of the same part.

Another object of the invention is to provide a device of the character described in which the parts thereof may be readily repositioned or reassembled in different relationships so as to adapt the device for different uses and applications.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side view of my device as assembled in position for use on the front wheel spindle of an automobile.

Figure 2 is a cross-sectional view taken on the line 2—2 of Figure 1.

Figure 3 is a cross-sectional view corresponding to Figure 2, but taken on the line 3—3 of Figure 1.

Figure 4 is a side view of the device as assembled and in working position on a rear automobile axle.

Figure 5 is a side view taken at right angles to Figure 4.

Figure 6 is a fragmentary side elevation of a portion of my device as arranged for application to a tapered shaft or spindle.

Figure 7 is a cross-sectional view taken on the line 7—7 of Figure 6.

In Figures 1 to 3, I have shown the device of my invention with the parts assembled to support a deflection gauge 12 on the front wheel spindle 13 of an automobile (not shown), so as to check possible deflection or misalignment as between inner and outer cylindrical bearings

2 surfaces 14 and 16 of the spindle which are designed to be in concentric relation to each other. Included as a part of my device is a collar 17 arranged to be slipped over the free end of the spindle and mounted to rotate on the primary surface 16 with which the concentricity of the secondary surface 14 is to be gauged. As surfaces 14 and 16 are spaced axially of the spindle, an arm or rod 18 is secured to the collar for supporting the gauge 12 therefrom in corresponding spaced relation and in such position that the actuating stem 19 of the gauge may bear against the surface 14 and retain contact therewith as the collar is rotated. The rod is bent to provide angular related portions 21 and 22 and is threaded at both free ends 23 and 24 so that either end may be removably engaged in a tapped hole 20 provided in the collar and extending parallel to the axis thereof. Portion 21 is preferably much longer than portion 22 in order to permit support of the gauge thereon in considerably spaced relation from the surface 16 regardless of which end of the rod is attached to the collar. Desirably the angular relationship of the rod portions is ninety degrees. As a means of clamping the rod in desired position in the hole 20, a setscrew 15 is operatively inserted in the hole and engaged with the inserted end of the rod.

As the spindle surfaces 14 and 16 as illustrated in Figure 1 are spaced apart appreciably and have but a relatively small difference in diameter, the rod is secured to the collar with the end 23 fitted in hole 20 so that the longer rod portion 21 will extend parallel to the axis of the spindle and in closely coupled relation throughout its length. Attachment of the gauge to the rod is preferably effected by means of a universal adjustable unit which includes a clamp 25 slidably and rotatably positioned on the rod and carrying a shaft 26 in which is mounted an arm 27 pivotally attached to the gauge. The arm is adjustable perpendicular to the shaft and may be rotated thereon to assume different positions about the axis of the arm. The arm, the shaft, and the clamp, are releasably held in adjusted position by means of a nut 28 having threaded connection with a screw portion 29 of the shaft.

The collar is designed to provide for a three-point bearing contact with the cylindrical surface 16 in order to adapt the device for accurate use with cylindrical surfaces of various diameters. As will be clear from Figure 2, there is provided as a part of the inner periphery of the collar, a pair of connected angularly related plane surface portions 31 and 32 preferably at right angles to each other and in opposed relation to a bearing point 33 along a line bisecting the angle defined by said surface portions. As here shown the point 33 is defined by the rounded free end of a stud 34 carried by a portion 36 of the collar which may be considered as a yoke connecting the outer ends of portions 31 and 32. Stud 34 is designed to resiliently engage the surface of the spindle and thus cooperate with the collar portions 31 and 32 in holding the collar firmly in position on the spindle and yet permit the collar and the parts carried thereby to be revolved about the spindle in a true circle. Desirably the stud is formed of an elastromeric material such as neoprene, and is preferably mounted in a bore 37 provided in a screw 38 engaging in the yoke portion 36 of the collar, a spring 39 being inserted in the bore to urge the stud in an outward position.

In order that the device will not mar the smooth and polished surfaces of shafts, the collar may be formed of a relatively soft material, such as a babbit metal, brass, and the like, and, by the use of such metal, the threads of screw 38 will become stripped before damage can be inflicted on the bearing surface in case any strains are set up, either in applying or operating the device. Likewise, the collar may be formed of spring steel, in order to permit a certain amount of resilience, and yet maintain the gauge stem and its contacting surface in proper engagement.

As will be clear the gauge will be supported so that the stem will engage the spindle surface in perpendicular relation, and for accurate testing a type of gauge is used which will indicate variations of one-thousandths of an inch. In applying the device, the parts are usually first assembled together and then mounted in assembled relation on the spindle, the screw 38 being initially held in a retracted position and moved inward to bring the surface portions 31 and 32 and the point 33 of the stud in firm but slidable engagement with the surface 16 of the spindle. After the stem of the gauge is placed in desired contact with the surface 14, the whole unit is slowly revolved about the spindle so that any variation in the concentricity of the two surfaces 14 and 16 will be indicated by the pointer on the face of the gauge dial. Conveniently, the actuating stem which moves the dial in response to pressure applied thereto, is usually positioned against the surface being calibrated in such manner that the pointer is able to move in either direction—that is, to show either a plus or minus deflection. Where the device is used for checking concentricity of cylindrical surfaces of widely different diameter, but arranged more or less in diametrical alignment, the collar and rod may be assembled with the threaded end of the shorter arm or portion 22 engaged in the hole 20 of the collar. Such an arrangement is illustrated in Figures 4 and 5, where the device is used for checking the concentricity of the lining surface on the segmental shoes of a brake, with respect to the axle. In this assembly the attaching unit for the indicator will be mounted on the arm 21 of the rod. In this manner the indicator rod may readily overlie the brake surface to be tested. Since in checking the brake shoes as above outlined extreme accuracy is not required, the use of an accurately calibrated linear deflection gauge such as illustrated in Figures 1 to 3 may be dispensed with, and in place thereof, simple indicator arm 44 may be mounted on the shaft 21 of the clamping unit, and provided with a pointer end 46 for engagement with or positioning on the brake surface aforesaid. Usually in this application, the collar will be mounted on a cylindrical portion 47 of the axle, and with the pointer end 46 engaged with the brake lining surface. Upon rotation of the device, any deviations of the lining surface from concentricity with the axle will be readily apparent to the operator, both visually and from the variation in the resistance to turning.

Where the collar is required to be positioned on a non-cylindrical surface, such as the tapered portion 48 of an axle, there is attached to the collar an equalizing member 49 which is designed to bear against the shaft surface in diametrically opposed relation to the point 33 of stud 34. Preferably the member is in the form of a leg which is secured to the collar by means of a screw 51, desirably engaging in the tapped hole 20. The leg is formed with a slot 52 to permit adjustment of the leg diametrically relative to the axle, and is seated in a recess 53 so as to prevent rotation of the leg about the screw 51. With the use of the equalizing member the collar will have a three point engagement with the axle longitudinally as well as transversely and by proper adjustment of the leg with respect to the taper of the shaft the collar and the parts supported thereby will be caused to move in a cylindrical path with and during rotation of the shaft.

I claim:

1. In a device of the character described, a collar having a threaded stem-receiving opening and a generally cylindrical shaft-receiving opening with its axis parallel to that of said first opening and having adjacent said first opening angular related planar bearing surfaces intersecting each other at an imaginary line passing through the centers of the two openings, a supporting member mounted in said collar opposite said bearing surfaces and adjustable radially of the collar, and a bearing stud resiliently carried by said member for longitudinal movement therein along said line.

2. In a device for use with an indicator for alignment or deflection of concentric surfaces, comprising a collar having an opening for the reception of one of such surfaces, means on said collar exteriorly of said opening for attachment to an indicator, said opening having adjacent one side thereof angular related planar bearing faces intersecting each other adjacent said side, a screw member mounted in said collar opposite said surfaces for movement axially to and from the intersection of said planar faces, a bearing stud carried by said member within said opening and movable longitudinally along said axis, and means resiliently resisting movement of said stud away from said intersection.

HOWEY J. KENNER.

REFERENCES CITED

The following references are of record in the file of this patent:

UNITED STATES PATENTS

| Number | Name | Date |
| --- | --- | --- |
| 1,674,417 | Thayer | June 19, 1928 |
| 1,825,988 | Wachner | Oct. 6, 1931 |
| 2,066,699 | Skelton | Jan. 5, 1937 |
| 2,087,497 | Blackman | July 20, 1937 |
| 2,371,451 | Larson | Mar. 13, 1945 |